(12) United States Patent
Bartlett et al.

(10) Patent No.: US 6,907,308 B1
(45) Date of Patent: Jun. 14, 2005

(54) REMOTE WAFER FLOW AND RECIPE EDITOR FOR SIMICONDUCTOR PROCESSING CONTROL

(75) Inventors: Richard J. Bartlett, Boony Doon, CA (US); Anthony P. Coniglio, San Jose, CA (US); David A. Steele, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 76 days.

(21) Appl. No.: 10/210,945

(22) Filed: Aug. 2, 2002

(51) Int. Cl.[7] .............................................. G06F 19/00
(52) U.S. Cl. .......................... 700/121; 700/87; 700/96; 717/170
(58) Field of Search ........................ 700/121, 87, 181, 700/96; 717/110, 113, 170; 707/203

(56) References Cited

U.S. PATENT DOCUMENTS

| | | | | |
|---|---|---|---|---|
| 5,492,605 A | * | 2/1996 | Pinarbasi | 204/192.11 |
| 5,555,410 A | * | 9/1996 | Tsuchiya | 707/104.1 |
| 5,588,103 A | * | 12/1996 | Aoyagi | 345/745 |
| 5,787,000 A | * | 7/1998 | Lilly et al. | 700/95 |
| 5,867,389 A | * | 2/1999 | Hamada et al. | 700/121 |
| 5,923,307 A | * | 7/1999 | Hogle, IV | 345/4 |
| 6,000,830 A | * | 12/1999 | Asano et al. | 700/121 |
| 6,161,054 A | * | 12/2000 | Rosenthal et al. | 700/121 |
| 6,268,853 B1 | | 7/2001 | Hoskins et al. | 700/83 |
| 6,269,279 B1 | * | 7/2001 | Todate et al. | 700/121 |
| 6,275,223 B1 | * | 8/2001 | Hughes | 345/751 |
| 6,415,193 B1 | * | 7/2002 | Betawar et al. | 700/97 |
| 6,745,142 B2 | * | 6/2004 | Fu et al. | 702/84 |
| 6,748,584 B1 | * | 6/2004 | Witchel et al. | 717/136 |
| 6,775,819 B1 | * | 8/2004 | Hardikar et al. | 717/105 |
| 6,834,370 B1 | * | 12/2004 | Brandl et al. | 715/500 |
| 2004/0148037 A1 | * | 7/2004 | Frampton et al. | 700/29 |

* cited by examiner

Primary Examiner—Paul Rodriguez
(74) Attorney, Agent, or Firm—Farjami & Farjami LLP

(57) ABSTRACT

A remote track editor system, method, and computer readable medium is provided to remotely edit track flows and recipes of semiconductor processing tools. The editor system includes a processing track, a track controller, and a remote track editor for remotely editing recipes of at least one semiconductor processing tool. The editor system communicates with remote terminals and accesses multiple flows and recipes stored on network databases through a SECS/GEM interface. The remote track editor edits recipes without interrupting the process track and correctly renumbers line and flow numbers of the recipes when editing, deleting, or inserting steps. The remote track editor also performs side-by-side comparisons of multiple recipes, verifies the contents of recipes to master recipes, and provides indicators of mismatches.

28 Claims, 12 Drawing Sheets

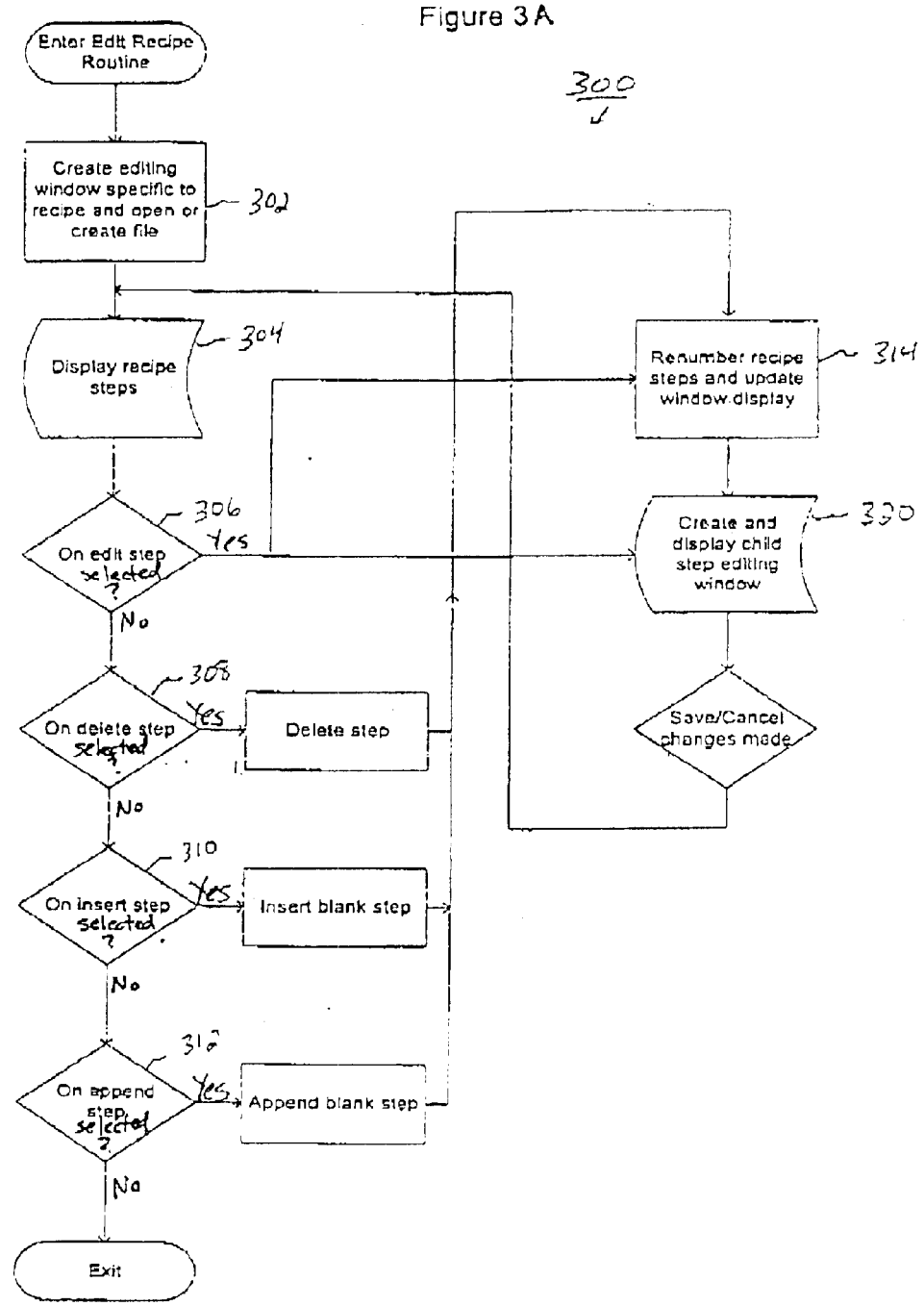

REMOTE WAFER FLOW AND RECIPE EDITOR FOR SIMICONDUCTOR PROCESSING CONTROL

BACKGROUND OF THE INVENTION

1. Field of the Invention

This invention relates to semiconductor processing, and more particularly to wafer flow and recipe editing for control of semiconductor processing equipment.

2. Description of the Related Art

The fabrication of semiconductor devices requires a large number of discrete processing steps to produce a complete semiconductor device. Specifically, a plurality of semiconductor devices usually begin as a single wafer of silicon and undergoes multiple processing steps such as epitaxial growth, resist development, etching, doping, etc. Wafers are generally fabricated together in batches of wafers called "lots" or "runs." The fabrication process creates an array of semiconductor devices on each wafer. At the completion of the wafer processing, the wafers are tested to determine circuit functionality, and may then be separated into individual semiconductor devices.

In such typical semiconductor processes, each of the various wafer processing steps is performed at a specific processing station or unit. The processing tool is provided with information representing a series of process flow steps and recipes that control a track of the tool and direct the wafer through the processing steps. The wafer flow is a logical sequencing of the wafer through the track's processing modules (or units) in a time efficient manner, and the recipe determines what (e.g., time, temperature, etc.) occurs at each step. For example, the flow determines the order of processing steps through a processing tool, and the recipe specifies various processing parameters such as temperature, pressure, and gas flow, which are used during the set-up and operation of a processing station. The flow and recipe together form a set of processing instructions that relate both a particular process station nd a particular processing step.

A flow has line numbers, flow numbers, unit numbers, and recipe numbers associated with each step in the process. To maximize the speed of processing the track may include several identical processing units referred to as duplicate units. For example, wafers may be placed in duplicate units, but will receive the same processing therein. A single processing unit on a track is referred to a unique unit. The processing speed of the tool depends, in part, on each module's processing speed. In general, slower modules have duplicates in order to increase the availability of that particular processing unit, whereby the track wafer throughput will increase, and decrease the overall lot or run processing time. Generally, the processing of wafers requires multiple steps, and runs several processing stations in parallel. This requires the track controller of a processing tool to store and manipulate many flows and recipes for processing the wafers.

Editing flows and recipes on known processing tools is done at the processing tool controller. Editing recipes at the processing tool controller requires that the processing tool be taken off-line because editing a recipe during production can cause faulty processing of the wafer and defects in the final product. When a processing tool is taken off-line valuable production time is lost. Consequently, reducing the down time of semiconductor processing equipment is of high importance. Therefore, a method to edit flows and recipes remotely of the various processing tools and without the need for taking the processing tools off-line is desired.

A further problem with existing track editors is that it is difficult and time consuming to compare recipe files of the track controller with the master track files to ensure the proper recipes are running on a given processing tool. It may take up to 8 hours per week to manually verify recipe contents of a typical track system with a master copy. In addition to employing someone to ensure proper recipe contents, this down time of the processing tool is a costly burden upon the output production.

Further, current track editors have limited intelligence that may lead to costly errors when editing recipes. For example, a recipe may contain several steps in the processing procedure. When deleting or adding a step in a recipe or flow, existing editors require operators to manually update line numbers and/or flow line steps. Manually updating the line numbers and/or flow line steps is a time consuming task and can lead to costly errors in the fabrication of semiconductor devices.

Existing editors also fail to provide the ability to easily manipulate flows and recipes. For example, a user cannot copy and rename files without the need of an empty recipe slot in the editor, whereby the recipe is copied to the empty slot with a different name. Finally, existing editors must be edited, and recipes input into, at the processing tool itself.

Thus, the present inventors have identified that what is desired is a remote track editor that allows users to remotely edit and import/export process flows and recipes of multiple semiconductor processing tools. Further, it would be desired that such an editor allow sophisticated manipulations of the flows and recipes. For example, the ability to renumber line and flow step modules during an editing process, and to easily rename, copy, print, and compare recipes side-by-side in a Windows multitasking and network environment is desired.

SUMMARY

According to one embodiment of the present invention, an editor system for editing flow and recipes of semiconductor processing equipment. The editor system includes a processing tool including a processing track with a plurality of processing steps, a track controller that uses flow and recipe data to control the sequence of the processing steps, and an editor for editing the flows and recipes remotely from the semiconductor tool. The editor edits flows and recipes of different semiconductor processing tools through Semiconductor Equipment Communications Standard/Generic Equipment Model "SECS/GEM" interfaces.

The editor system may further communicate with multiple track controllers or host controllers that are remotely located within a fabrication clean room, each through a SECS/GEM interface, and operate on multiple track controllers simultaneously. The editor system may further access local, remote, and host controller recipe and flow databases. The editor edits flows and recipes without interrupting the process track and correctly renumbers line and flow numbers of the recipes when editing, deleting, or inserting process steps. The editor can further perform side-by-side comparisons of multiple recipes, verify the contents of the track recipe files with master recipes, and provide indicators of mismatches. The editor allows one to copy, rename, and print recipes. Finally, the editor allows one to export and import recipes to and from remote recipe databases.

According to another embodiment of the present invention, a method for editing recipes of track controllers of various semiconductor tools of, e.g., different types is provided whereby a track controller is remotely accessed and the flows and recipes edited. Remotely accessing the track controller may be performed through a SECS/GEM interface. The editing step may comprise renumbering flow and line numbers in accordance with the specific edit, deletion, or insertion made to the recipe. The editing step may further comprise comparing a track recipe with a master track recipe and indicating any differences. Further, the method may comprise exporting flows and recipes from the track controller and importing flows and recipes to the track controller from a remote database.

According to another embodiment of the present invention, a computer readable medium that performs the steps of remotely accessing a track controller of a semiconductor processing tool and remotely editing track recipes used by the track controller. Remotely accessing the track controller may include communicating through a SECS/GEM interface. Remotely editing may further include any of the following: renumbering flow and line numbers according to the edits made, displaying multiple recipes side-by-side, or comparing two or more recipes and indicating any differences between the two.

The present invention is better understood upon consideration of the detailed description below and the accompanying drawings.

BRIEF DESCRIPTION OF THE DRAWINGS

FIG. 3A is a flow chart of an exemplary operation of the edit recipe function of the present invention.

In the present disclosure, like objects which appear in more than one figure are provided with like reference numerals.

DETAILED DESCRIPTION

In accordance with the present invention, a method and system are provided for remotely editing, updating, copying, and verifying process flow and recipes of multiple semiconductor processing tools without interfering with the operation of the processing equipment, and further offering greater opportunities for manipulating recipe data. The editing system remotely edits multiple processing tools allowing one to quickly update flows and recipes for multiple processing tools from a single remote location. Further, remote access allows control of the processing equipment remotely (i.e., through an Intranet or Internet connection). Remote access also allows for different facilities located in different locations around the world to share and compare recipes. A more secure back-up storage of recipes is also provided that allows for quickly verifying the content of track recipe files to master recipe files. Further, remote access allows for greater storage of multiple recipes within a shared network database or in a remote computer database.

The present system and method also provides greater intelligence than do existing recipe editors to reduce renumbering errors when inputting or editing recipes steps. Further, the method and system allow users to compare various recipes side-by-side, store comments with the recipes, and create user profiles unique to each user.

Figure 1:
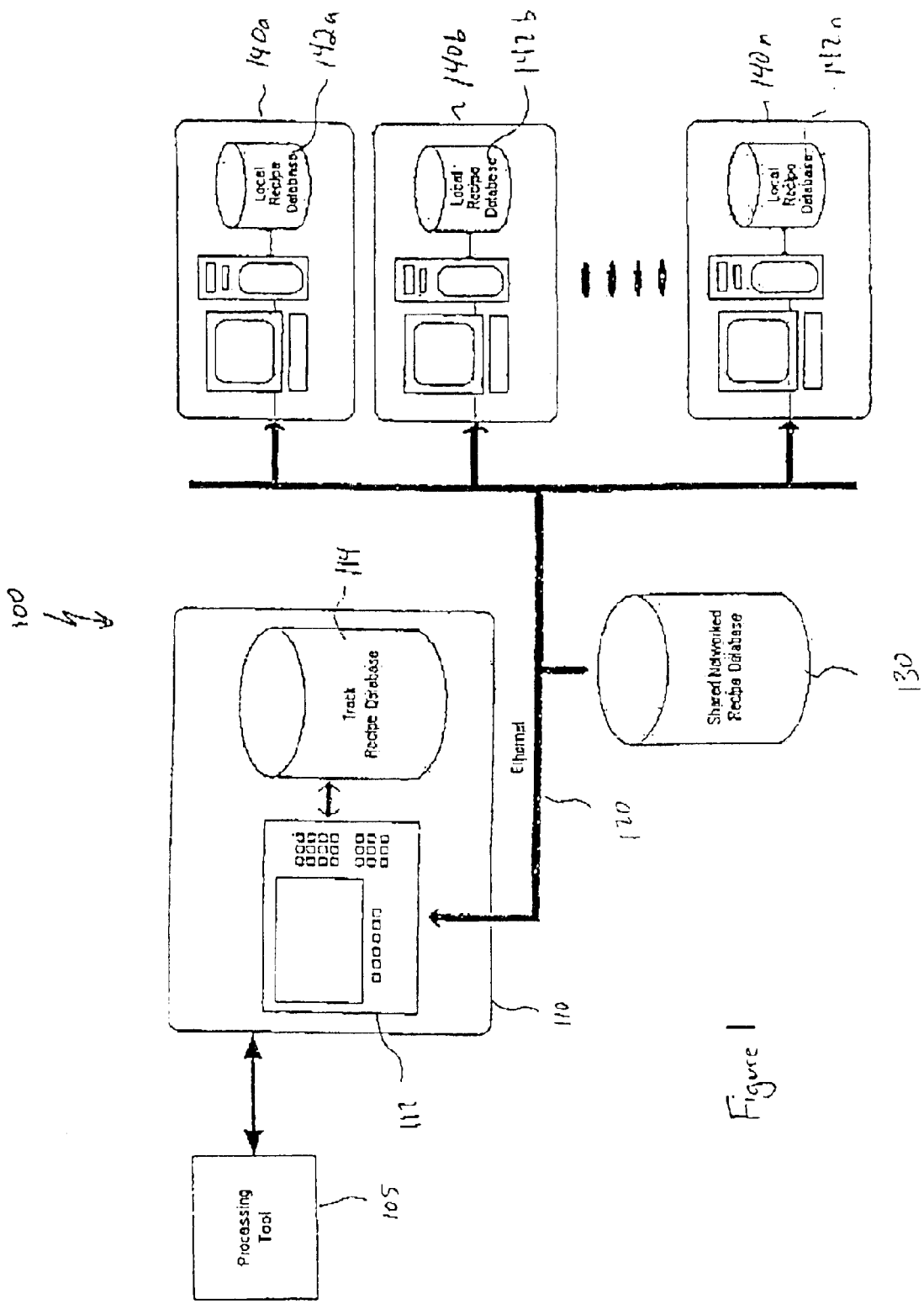
FIG. 1 is a block diagram of an exemplary track editor system in accordance with an embodiment of the present invention.

FIG. 1 is a block diagram of an exemplary system 100 in accordance with an embodiment of the present invention. A track computer controller 110 operates with conventional track processing modules 105 to control the path of the semiconductor wafer within track processing module 105. Track computer controller 110 includes a conventional user interface 112 that may further include a screen and keyboard or other means for a user to control and input track recipe and flow information. Track computer controller 110 further includes a conventional track flow and recipe database 114 for storing track flows and recipes. Track computer controller 110 can be, for example, a TEL Mark 5, 7, or 8 Coater Track manufactured by Tokyo Electron Labs Ltd. of Japan. The TEL Mark 5, 7, or 8 has a track recipe editor built in, however, the present editor system and method provide remote access to the track computer controller of multiple semiconductor processing tools and improved editing capabilities of the flows and recipes.

Track computer controller 110 operates with remote software, such that track computer controller 110 may communicate with a conventional Ethernet connection 120 or other remote connection. The remote software can include a SECS/GEM interface or other suitable custom interface for the particular track computer controller 110 to communicate with remote terminals or databases. SECS/GEM interfaces are well known in the art for use by a computer to control semiconductor processing equipment. In this manner, the editing method and system may remotely edit and communicate with different and multiple semiconductor processing tools.

The Ethernet connection 120 allows the track computer controller 110 to communicate with a shared network recipe database 130. Further, the track computer controller 110 can communicate via the Ethernet connection 120 to one or more remote computers 140*n* (where n=a, b . . . n). Remote computers 140*n* are, e.g., a Windows® based workstation running suitable software in accordance with an embodiment of the present invention to communicate with computer controller 110 (Of course, other operating systems may be used). Remote computers 140$n$ may further each include a local recipe database 142$n$ (where n=a, b . . . n). In this manner users view, edit, compare, etc. recipes of various semiconductor tools from remote computers 140$n$ without interrupting the track process. Further, users may share and compare various recipes easily within an Intranet or networked environment. Thus, the present remote editor may, for example, utilize Windows multitasking and a network environment to allow for desktop recipe management from any windows based computer within an Intranet network. This allows for one to view, edit, compare, and print multiple recipes at the same time from remote locations.

FIGS. 2A, 2B, 2C, and 2D show exemplary flow charts of the exemplary operation 200 of the present method. Beginning with FIG. 2A, the user begins at start 202 from either a remote computer 104$n$, or at the computer track controller 110 (see FIG. 1). The system determines the identity of the user at block 210, loads the user's specific profile, and enables a recipe menu and sets the directory at block 212. If the user is a first time user the system loads the default settings for use at block 214.

At block 216 the user may chose from several options displayed in a main dialog window. The options may include file 218, recipe 220, config 222, and drive 224. The system may include various other options, for example, a help menu to guide new users through the system. Block 224 allows the user to set, browse, and select the various directories that are connected through the Ethernet or other networked connection. Thus, a user at a remote computer 140$n$ can access other remote directories. The operation of file 218, recipe 220, and config 222 are more fully described in FIGS. 2B, 2C, and 2D.

Figure 2A:
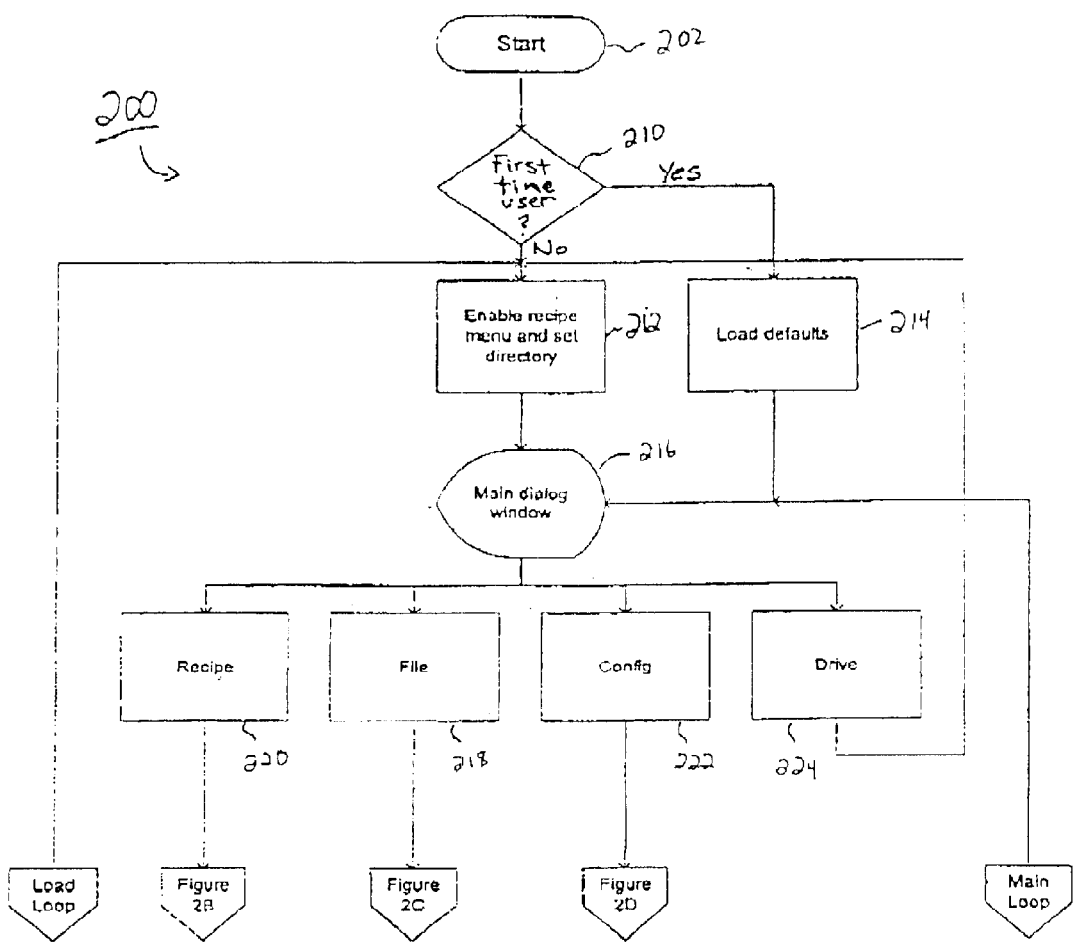
FIG. 2A is a flow chart showing an exemplary operation for the system and method of the present invention.
Figure 2B:
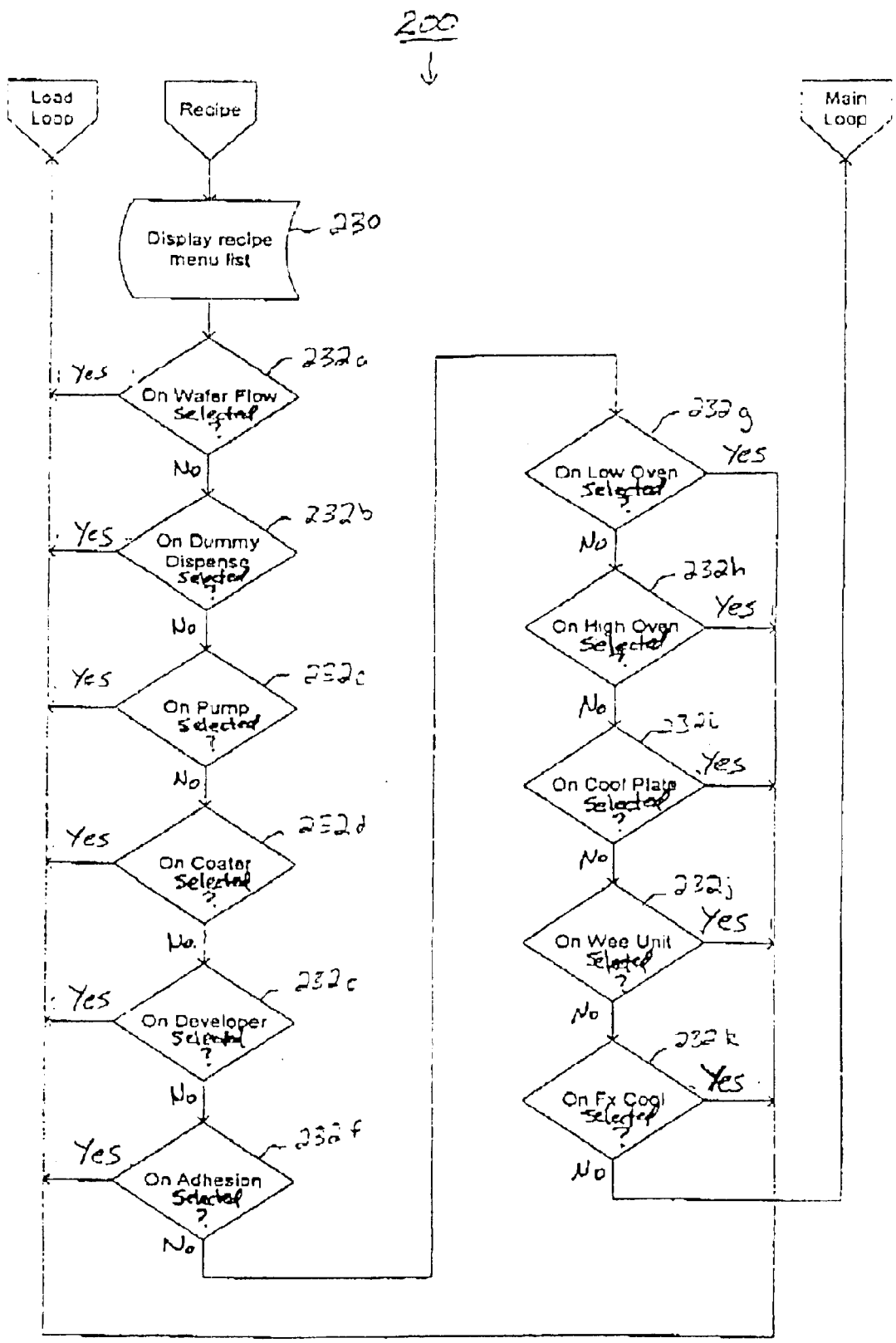
FIG. 2B is a flow chart showing an exemplary operation for the recipe and flow portion of the system and method of the present invention.

FIG. 2B is a flow chart showing the exemplary operation 200 for the recipe 220 portion of the system and method of the present invention. Initially, a recipe menu list is displayed in block 230. From here the user may select and load various recipe types and database structures. To load a recipe type the user selects one of the recipe types 232$n$ (where n=a, b . . . n). For example, to load a wafer flow the user selects the wafer flow in block 232$a$, or to load the high oven recipe the user selects the high oven in 232$h$. The selected recipes are then loaded via the load loop to update the recipe menu and the set directory window in block 212 of FIG. 2A. An example of a directory listing is described in reference to FIG. 4B. (The recipes shown in FIG. 2B are for exemplary purposes only and other recipes may be included.)

Figure 2C:
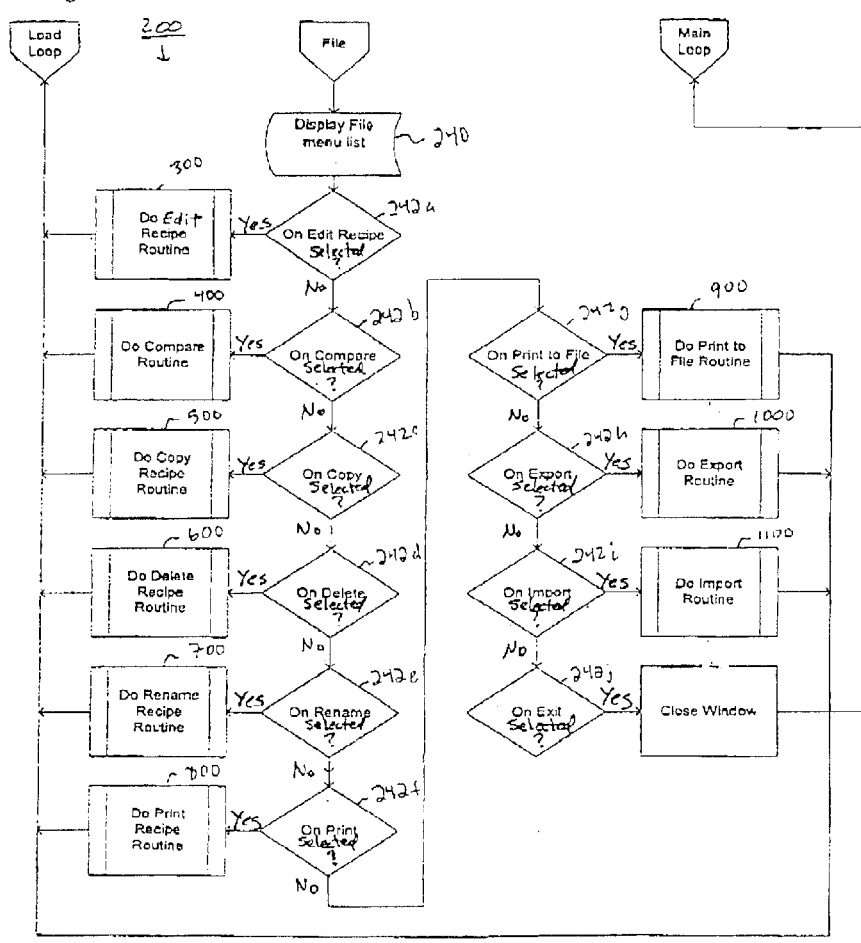
FIG. 2C is a flow chart showing an exemplary operation for the file portion of the system and method of the present invention.
Figure 3B:
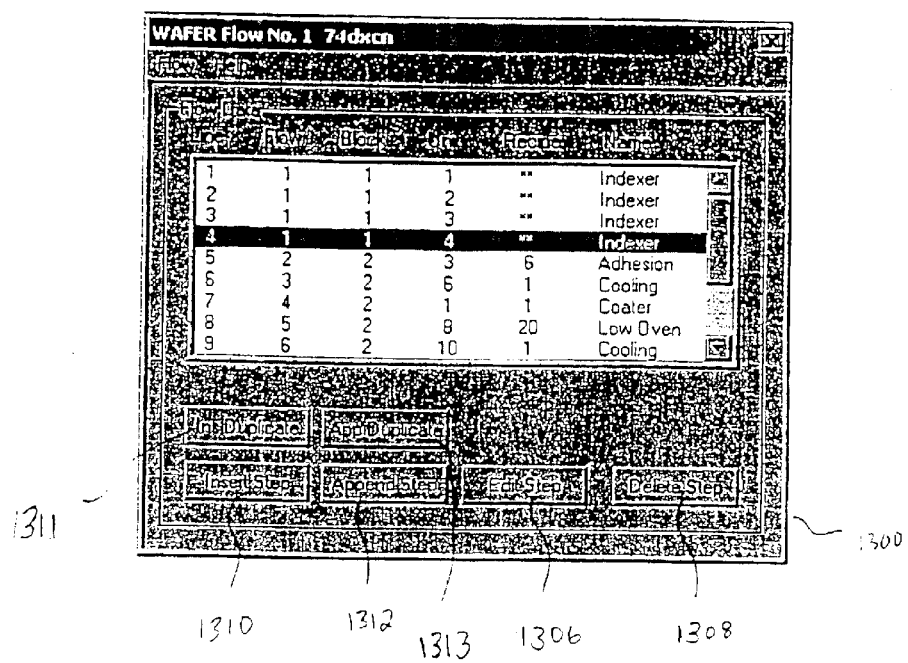
FIG. 3B is a diagram illustrating an exemplary user interface associated with the edit recipe function of the present invention.

FIG. 2C is a flow chart showing the exemplary operation 200 for the file 218 portion of the present system and method. Initially, a file menu list is displayed in block 240. Similar to the operation of the recipe 220 portion, the file 218 portion provides several choices for the user. The first block 242$a$ allows the user to edit a recipe as described in reference to FIGS. 3A and 3B. If selected, the system enters the edit recipe routine 300 as shown in FIG. 3 and described in detail below. After editing the recipe in edit recipe routine 300, the edited recipe is then loaded via the load loop and the set directory is updated appropriately in block 212 FIG. 2A).

Other exemplary features of the present method for manipulating recipes are selected by a user within the file 218. A brief discussion of the various options, 242$b$ through 242$j$, will now be described, followed by a more detailed discussion in relation to FIGS. 3 through 11. Block 242$b$ allows a user to compare multiple recipes side by-side via compare routine 400. Block 242$c$ allows a user to copy an entire recipe or recipes via copy recipe routine Block 242$d$ allows a user to delete an entire recipe or recipes via delete recipe routine 600. Block 242$e$ allows a user to rename a recipe without copying a recipe to an open slot with a new name via rename recipe routine 700. Block 242$f$ allows a user to print a recipe via print recipe routine 800. Block 242$g$ allows a user to print a recipe to a file via print to file routine by translating the binary recipe into, e.g. an ASCII readable file. Blocks 242$h$ and 242$i$ allow a user to import and export a flow and recipe to and from the remote locations via export routine 1000 and import routine 1100. Finally, the user exits the file 218 portion by selecting block 242.

Figure 2D:
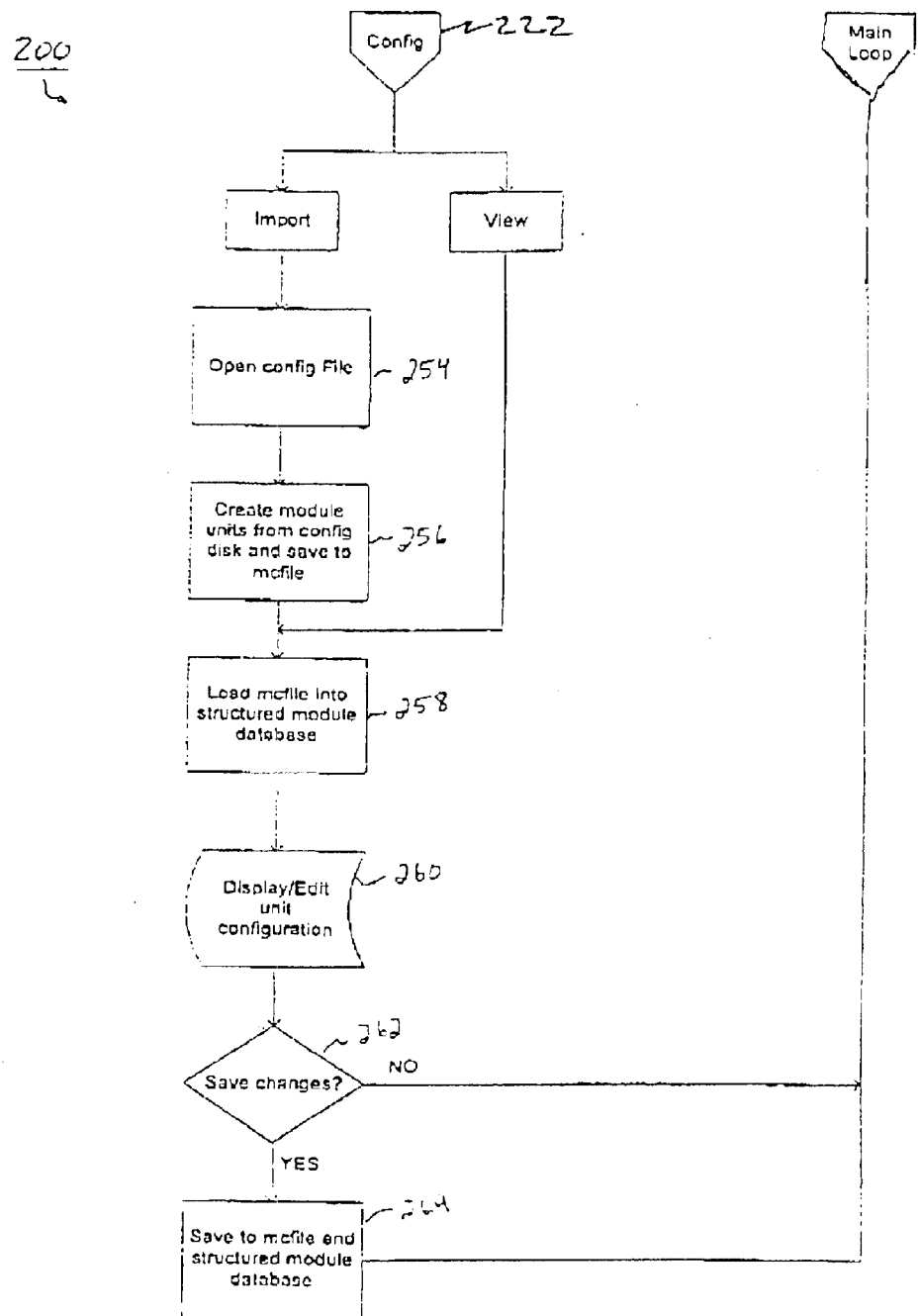
FIG. 2D is a flow chart showing an exemplary operation for the import and view portions for process module configuration of the system and method of the present invention.

Figure 2D is a flow chart showing the exemplary operation 200 for the config (configuration) 222 portion of the present system and method. The config 222 portion includes an import and view function. Recipes may be scanned via the import function in order to automatically pre-build the respective tracks configuration, locating and identifying the various process modules that comprise a given track. This may function through the remote connections from a remote track controller or shared network database. A config file is then opened at block 254. Module units are then created and configured for the particular processing tool. These module units are created and saved to a machine configuration file "mcfile" in block 256. The mcfile is then loaded into a processing tool is then displayed and edited by the user in block 260. Thus, the editing system of the present invention can be configured to edit any processing tool. The user may then choose to save or cancel any changes made at block 262. If saved, the system saves the edited unit configuration to the mcfile and structured module database in block 264.

FIG. 3A is a flow chart of an exemplary operation of the edit recipe routine 300 according to an embodiment of the present invention. The recipe and flow editing correctly renumbers the line and flow numbers (i.e., the processing steps or modules) during various editing functions. For example, a user may wish to insert new or duplicate steps above or below a current step. Renumbering the steps after an edit is very important for ensuring the correct order of processing steps. The present method and system recognize whether a duplicate or unique step is being deleted or added and will renumber the remaining line and flow steps accordingly, thereby reducing errors and saving time necessary to ensure the correct numbering.

The edit recipe routine 300 begins at block 302, where a user opens or creates a new recipe file to edit. Recipe steps are displayed at block 304. The user may select to edit a step of the recipe in block 306, delete a step of the recipe in block 308, insert a step into the recipe in block 310, or append a step into the recipe in block 312.

If edit a step is selected in block 306, a child window is created in block 320 for editing the specific recipe chosen. After editing the recipe the user may further chose to cancel any changes made before saving them to the database.

The user may also select to delete a recipe step in block 308. When a recipe step is deleted the recipe steps are renumbered and updated accordingly. For example, if a unique recipe step is deleted the remaining steps are renumbered, but if a duplicate step is deleted the remaining steps are not renumbered.

The user may also insert or append a step (i.e., insert a step above or below the currently selected step) in blocks 310 and 312. In some embodiments the user may further select whether the inserted or appended step is a duplicate step. After a step is inserted or appended into the recipe, the recipe steps are renumbered and updated in block 314.

FIG. 3B shows an exemplary user interface, or "screen shot," of the editing process according to one embodiment of the present invention. Window 1300 contains the flow data for a specific wafer flow. The first column "Line" lists the line number of the flow data in sequential order. The second column "Flow" indicates the flow (or step) of that line of data. Each processing module is known by its block and unit number found in the "Block" and "Unit" column. The "Recipe" column contains a recipe number for modules that require one and "**" for those modules that do not require a recipe number. Finally, the "Name" column contains functional description of the modules.

A duplicate step is indicated when there is more than one flow number, for example, in this example there are four lines with the flow number "1" (the first four are indexers). This indicates that these four steps are duplicate steps, and during processing a wafer will be accepted by the first available indexer unit. For unique flow line numbers, such as the Adhesion step, the wafers must wait for that unit to be available to continue processing. The duplicate units therefore increase throughput of the track because it increases the probability of a unit being available.

Editing a recipe or flow sequence presents problems in the numbering of the "Line" and "Flow" numbers. For example, when deleting a duplicate flow step, the "Line" numbers should be renumbered, but not the "Flow" numbers, whereas when deleting a unique flow step, both the "Line" numbers and the "Flow" numbers need to be renumbered. Similar problems are presented when inserting or editing flow steps.

As shown, window 1300 includes a delete step button 1308, edit step button 1306, append step button 1312, append duplicate step button 1313, insert step button 1310, and insert duplicate step button 1311. Delete step button 1308 allows a user to delete a step from the flow and renumber the flow and line numbers based on whether a duplicate or unique step was deleted. Edit step button 1306 allows the user to edit the particular line number selected. If the line number selected is changed from a duplicate step to a unique step, or vise versa, the flow and line numbers are renumbered accordingly. Append step button 1312 and append duplicate step button 1313 add a line number below the selected flow line and renumber the flow and line numbers accordingly. Insert step button 1310, and insert duplicate step button 1311 inserts a step above the selected flow line and renumber the flow and line numbers accordingly.

Thus, the present method and system allow the user to edit, delete, and add flows and recipe steps in many convenient ways, and further includes the ability to renumber the line and flow numbers accordingly. Correctly renumbering line and flow numbers will reduce costly errors in the processing steps that may occur when editing and incorrectly renumbering the flow and line numbers.

Figure 4A:
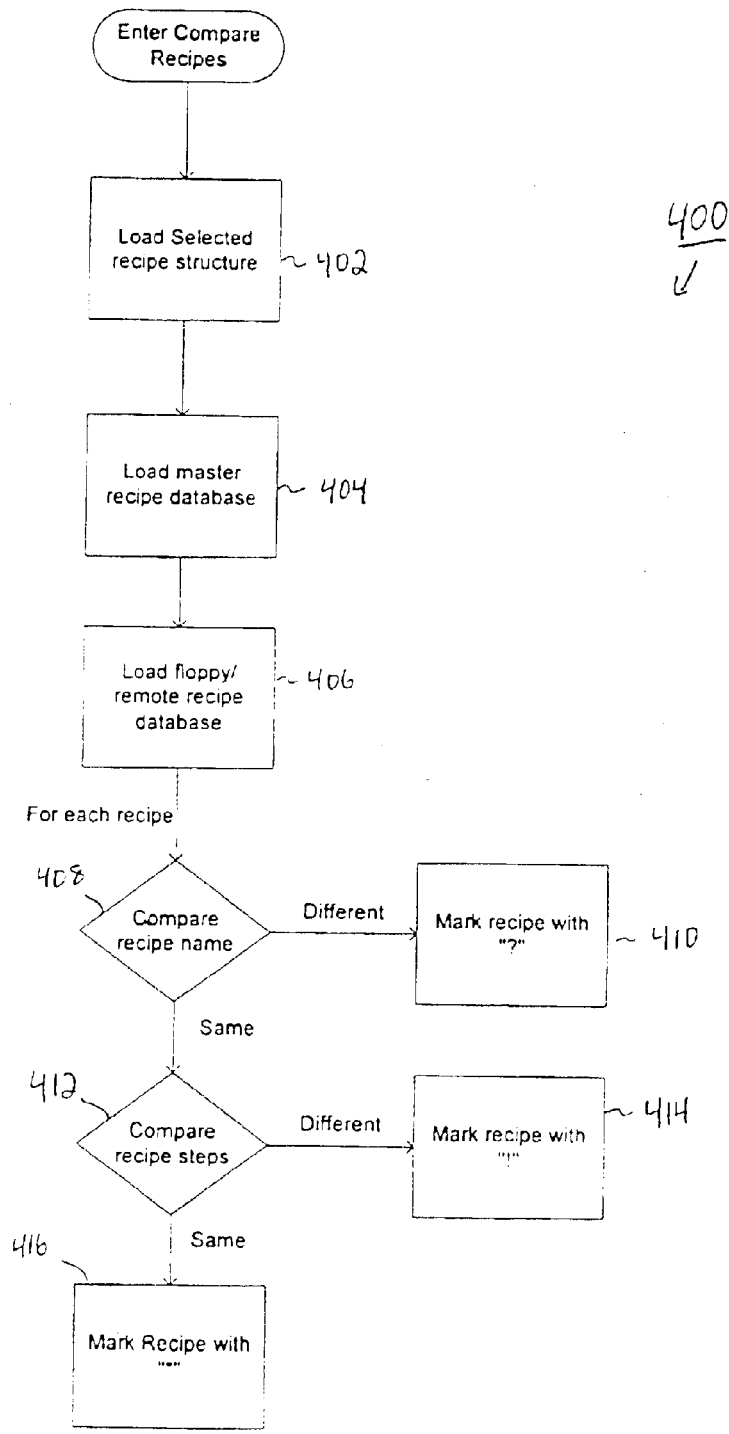
FIG. 4A is a flow chart of an exemplary operation of the compare recipe function of the present invention.

FIG. 4A is a flow chart of an exemplary operation of the compare recipe routine 400 according to an embodiment of the present invention. The compare recipe routine 400 of the present invention allows a user to open and view numerous recipes and flows simultaneously. Viewing multiple recipes and flows simultaneously allows one to easily compare or check recipes with one another side-by-side. In particular the compare recipe routine 400 allows a user to quickly check flows and recipes between saved sets and the backup recipes for the track (i.e., between the track recipes and the master recipes). In one embodiment the compare recipe routine 400 will compare each track recipe with the master recipe, and mark each track recipe with a character to signify the status of each recipe (i.e., whether each recipe matches the master recipes). This function saves time lost to verifying flow and recipe contents, and prevent monetary losses for missprocessed lots or runs.

The system first loads the selected recipe structures into the database in block 402. The system then loads the master recipe database in block 404 followed by the remote recipe database in block 406. The remote recipe database can be stored and loaded from, for example, a floppy disk or from a remote computer 140*n*.

Block 408 compares the names of the recipes and determines if the two recipes that are being compared have identical recipe names. If the names are different the recipes can be marked with a "?" in block 410 to signify that the names do not match. Of course, other means can be used to signify to a user that the names do not match, for example, highlighting or displaying in different colors the mismatching recipes.

Additionally, block 412 compares the recipe steps of two corresponding recipes and determines if the two recipes have identical steps. If the recipe steps are different the recipes can be marked with a "!" or other identifier in block 414 to signify to the user that the recipe steps of the two recipes are not identical. If the recipe steps are identical the recipes can be marked with a "*" or other identifier in block 416 to signify to the user that the recipes steps of the two recipes are the same.

The identifiers allow a user to quickly verify the contents of the track recipe files with the master recipe files. The user, after identifying which track recipes do not match the master recipes by viewing the indicators (i.e., "!", "?", or "*"), can then view the recipes side-by-side to determine where they do not match and correct any errors. An error in a recipe may defectively process a lot or run of wafers leading to the need to verify the recipe contents. Thus, the method and system of the present invention provides a quick and accurate method to verify and compare the contents of two or more recipes.

Figure 4B:
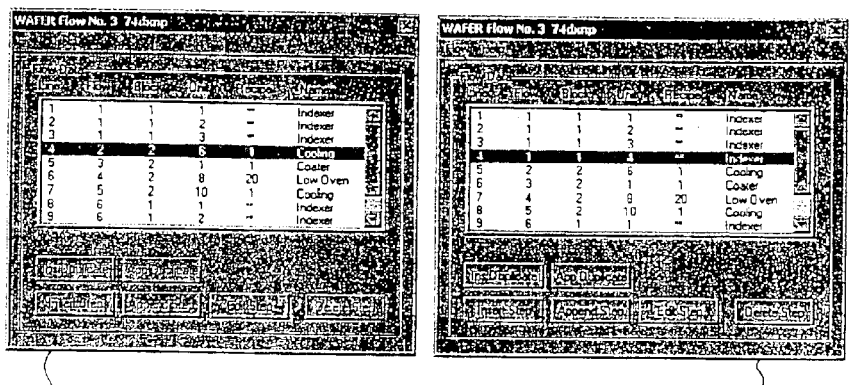
FIG. 4B is a diagram illustrating an exemplary user interface associated with the compare recipe function of the present invention.
Figure 4B:
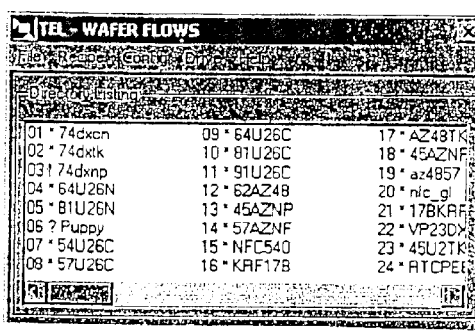

FIG. 4B shows an exemplary user interface, or screen shot 1400, of the compare recipe process according to one embodiment of the present invention. As shown, recipe window 1440, recipe window 1440', and directory listing window 1441 can all be displayed simultaneously on the same screen 1400. Recipe windows 1440 and 1440' display a master recipe file and a track recipe file side-by-side. Directory listing window 1441 displays a listing of all the track recipes and indicates the similarities and dissimilarities to the master copies.

A user may first view the directory listing window 1441 to quickly determine those recipes that differ from the master recipe file. As described with respect to the flow chart above, a track recipe that is the same as the master file is marked with a "*", a track recipe that contains steps that are not identical is marked with a "!", and a track recipe with a name that does not match is marked with a "?".

For example, the third listing on the directory is marked with a "!", signifying that recipe steps of the track recipe do not match the master recipe. A user may then open and view both the track recipe and the master recipe corresponding to the third recipe as shown in recipe windows 1440 and 1440' The line number or numbers that do not match can quickly" be located because the user can view the recipes side-by-side on a single screen. Further, the error can be corrected directly from recipe window 1440 or 1440' by using the editing functions of the recipe windows 1440 or 1440'.

Directory listing window 1441 further contains a "?" next to the sixth recipe entitled "Puppy" to signify that this particular recipe named in the track file does not match the file name in the master recipe file. Finally, directory listing window 1441 contains a "*" next to each track file that matches the master recipe file. Thus, the present method provides a quick method to compare the contents of the track recipe files with the master recipe files and make any necessary edits on a single screen.

Figure 5:
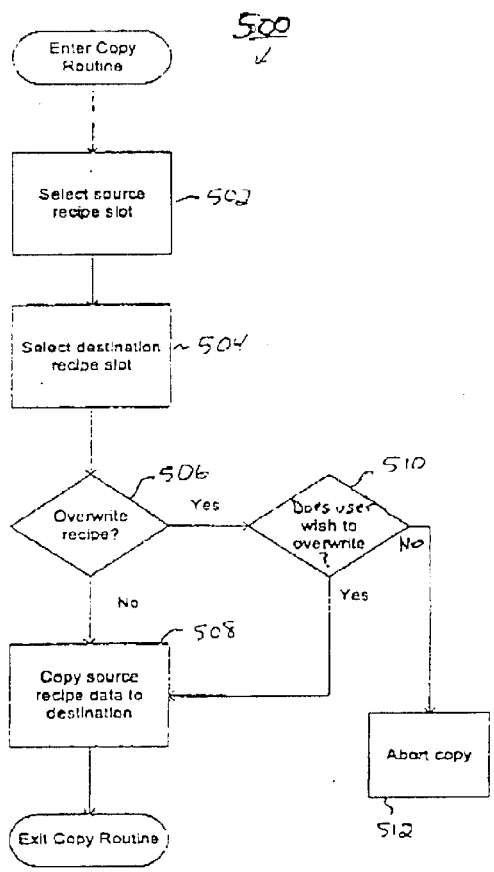
FIG. 5 is a flow chart of an exemplary operation of the copy recipe function of the present invention.

FIG. 5 is a flow chart of an exemplary operation of the copy recipe routine 500 according to one embodiment of the present invention. The copy recipe routine 500 allows a user to copy a recipe to an empty or occupied slot without the burden of first deleting a recipe to create an open or empty slot.

A recipe is copied by first selecting the desired recipe in block 502. A destination is then selected for the copy of the recipe in block 504. Block 506 determines if the destination selected for the copy is empty or contains a current recipe, i.e., whether the user going to overwrite a current recipe. If the destination is empty the recipe data is copied to the destination in block 508. If the destination contains a current recipe a warning is given to the user that the action will overwrite a current recipe in block 510. If the user proceeds with the copy, the recipe data is copied to the destination in block 508, thereby overwriting the previous recipe data. Alternatively, the user may not have intended to overwrite an existing recipe data and may select to abort the copy to that particular destination in block 512.

Figure 6:
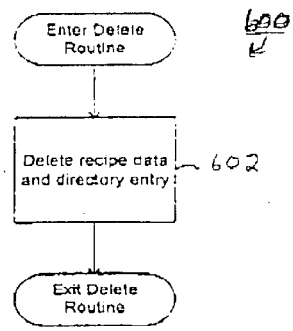
FIG. 6 is a flow chart of an exemplary operation of the delete recipe function of the present invention.

FIG. 6 is a flow chart of an exemplary operation of the delete recipe routine 600 according to one embodiment of the present invention. Delete recipe routine 600 allows a user to quickly delete recipe data and the directory entry simply by selecting the recipe in block 602.

Figure 7:
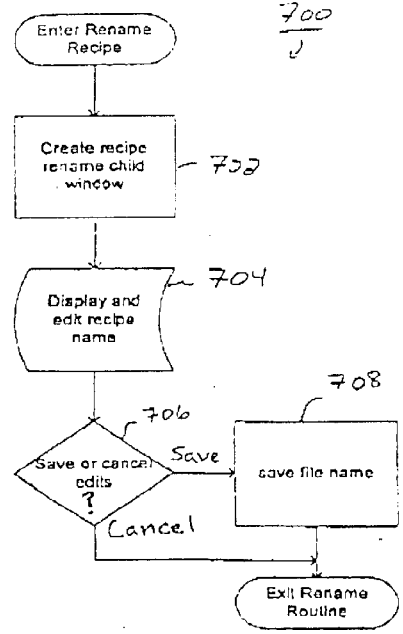
FIG. 7 is a flow chart of an exemplary operation of the rename recipe function of the present invention.

FIG. 7 is a flow chart of an exemplary operation of the rename recipe routine 700 according to an embodiment of the present invention. Rename recipe routine 700 allows a user to simply rename a recipe in its place. Renaming a recipe in place dispenses with the burden of deleting recipes and copying recipes into new destinations under new names. A new window for renaming the recipe is created in block 702. A selected recipe is displayed in block 704 and the user can edit the recipe name. Before the edited name is committed and saved to the system, the user can select to save or cancel the edits in block 706. If the user selects to save the name in block 706, the new name is saved to the system in block 708 (otherwise the edits are discarded).

Figure 8:
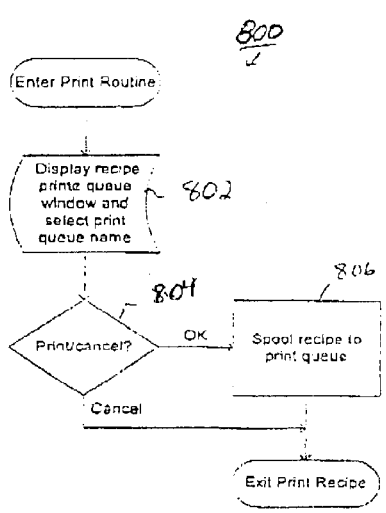
FIG. 8 is a flow chart of an exemplary operation of the print recipe function of the present invention.

FIG. 8 is a flow chart of an exemplary operation of the print recipe routine 800 according to one embodiment of the present invention. The print recipe routine 800 allows one to print both a directory listing of recipes/flows (i.e., their numbers and names) as well as print the actual recipe and flow steps of an individual recipe or flow. The recipe and flows can be printed either to an ASCII text file, or to a local or networked print queue. As seen in FIG. 8, a window is created at block 802 from which a user can select the recipe to be printed. After selecting "OK" in block 804, the recipe is spooled to the print queue in block 806.

Figure 9:
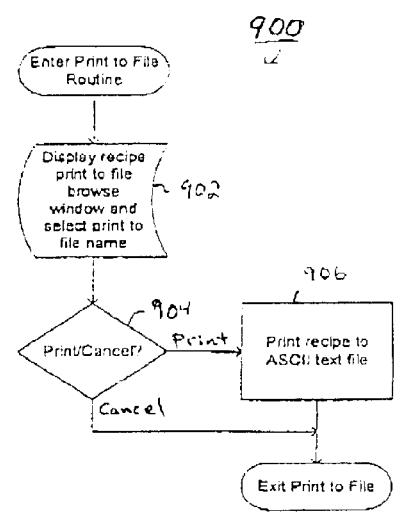
FIG. 9 is a flow chart of an exemplary operation of the print to file recipe function of the present invention.

FIG. 9 is a flow chart of an exemplary operation of the print to file recipe routine 900 according to one embodiment of the present invention. Similarly to block 802, a window is created from which a user can select the recipe to be printed. After selecting "OK" in block 904, the recipe is printed to an ASCII Text file in block 906.

Figure 10:
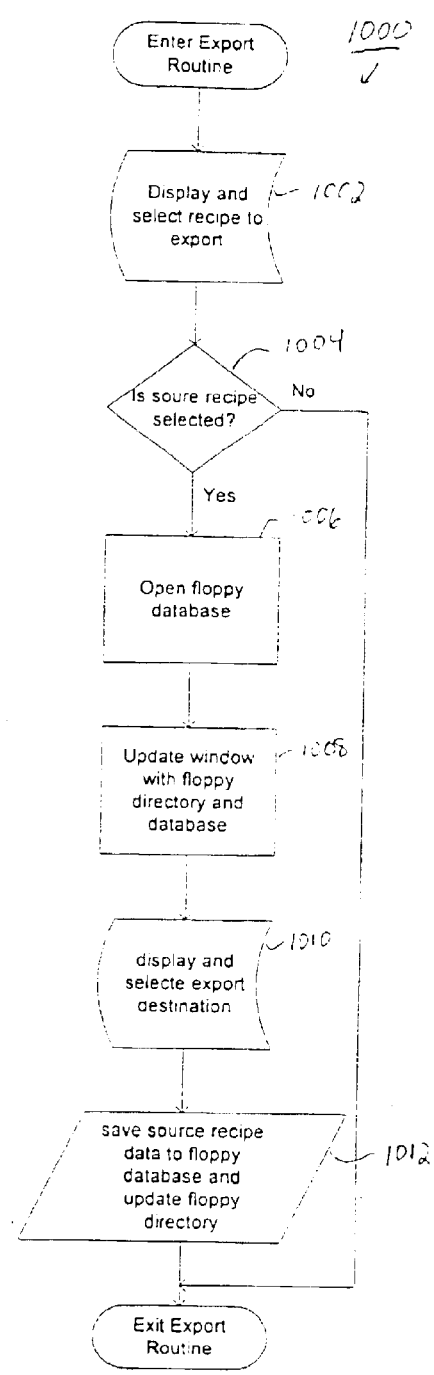
FIG. 10 is a flow chart of an exemplary operation of the export recipe function of the present invention.

FIG. 10 is a flow chart of an exemplary operation of the export recipe routine 1000 according to one embodiment of the present invention. A user selects the recipe to export from the display in block 1002. Block 1004 determines if the source recipe is selected. If the source recipe is not selected the export recipe routine 1000 is aborted. If the source recipe is selected an appropriate database, e.g., a disc drive or remote database, is opened in block 1006. The display window is updated in block 1008 with the remote directory and database. The user can then select the export destination in block 1010. Finally the source recipe data is saved to the remote database and the remote directory is updated in block 1012. Of course, the export recipe routine 1000 may export a recipe to a remote or shared network recipe database following the same basic operation described herein.

Figure 11:
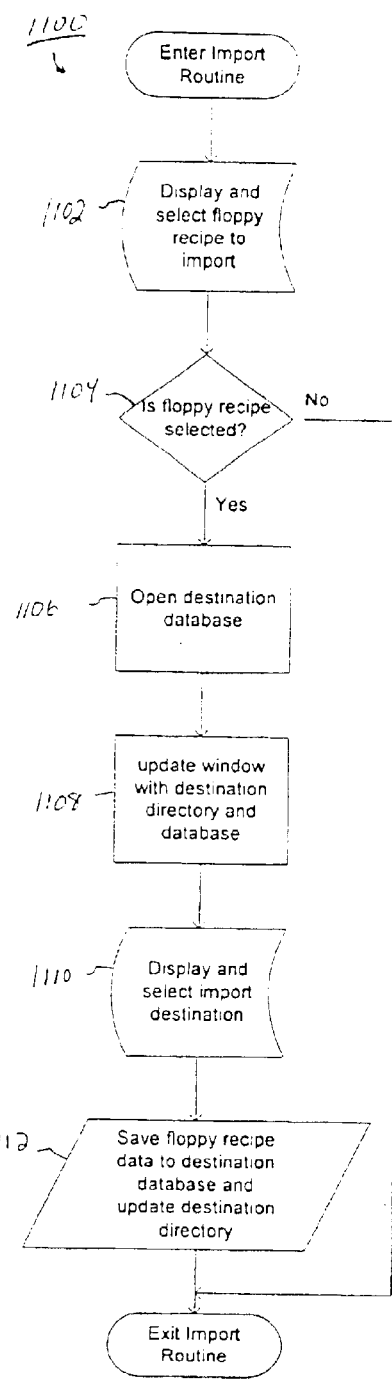
FIG. 11 is a flow chart of an exemplary operation of the import recipe function of the present invention.

FIG. 11 is a flow chart of an exemplary operation of the import recipe routine 1100 according to one embodiment of the present invention. A user selects the recipe to export from the display in block 1102. Block 1104 determines if the remote recipe is selected. If the remote recipe is not selected the import recipe routine 1100 is aborted. If the remote recipe is selected the destination database is opened in block 1106. The display window is updated in block 1108 with the destination directory and database. The user can then select the import destination in block 1110. Finally the source recipe data is saved to the remote database and the remote directory is updated in block 1112. Of course, the import recipe routine 1100 may import a recipe from a remote or shared network recipe database following the same basic operation described herein. Thus, a user may export and import recipes to and from remote databases via an Ethernet or other remote connection means.

Thus, in accordance with the principles of the present invention, a method and system for remotely editing, updating, copying, and verifying recipes of processing equipment without interfering with the operation of the processing equipment, and offering greater opportunities for manipulating, storing, and sharing the recipe data is described.

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instruction in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

The above detailed descriptions are provided to illustrate specific embodiments of the present invention and are not intended to be limiting. Numerous modifications and variations within the scope of the present invention are possible. For example, the flow charts described herein are for exemplary purposes only, and many alternative variations of the particular processes and steps may be employed as is well known in the art. The present invention is defined by the appended claims.

We claim:

1. An editor system for editing flows and recipes for semiconductor material processing using at least one semiconductor processing tool, comprising:
   a processing track with a plurality of processing modules, each with a plurality of processing steps;
   a track controller, wherein the track controller uses flow and recipe data to control a sequence of the processing steps;
   an editor for editing the flow and recipe data without interrupting the processing track, wherein the editor is located remotely from said at least one semiconductor processing tool;
   a processing module configured to allow a user to open and view a plurality of flows and recipes simultaneously.

2. The system of claim 1, wherein the system is operable with a plurality of semiconductor processing tools of at least two different types.

3. The system of claim 1, wherein multiple flows and recipes are stored on a database remote from and in communication with said track controller.

4. The system of claim 1, wherein multiple flows and recipes are stored on a network remote from and accessible by said system.

5. The system of claim 1, wherein a remote terminal communicates with the track controller through a SECS/GEM interface.

6. The system of claim 1, wherein the editor renumbers line and flow numbers of the recipes in accordance with specific edits made.

7. The system of claim 1, wherein the editor renumbers the processing steps if a unique step is deleted or inserted, and does not renumber the remaining processing steps if a duplicate step is deleted or inserted.

8. The system of claim 1, wherein the editor displays multiple recipes side-by-side concurrently from a single database or from multiple databases.

9. The system of claim 1, wherein the editor compares at least one recipe with at least one master recipe and indicates differences between the at least one recipe and the at least one master recipe.

10. The system of claim 1, wherein the editor can copy a recipe to an occupied slot.

11. The system of claim 1, wherein the editor can rename recipes in place.

12. The system of claim 1, wherein the editor prints recipe steps of an individual recipe.

13. The system of claim 1, wherein the editor exports recipes from a track controller database.

14. The system of claim 1, wherein the editor imports recipes to a track controller database.

15. A method for editing flows and recipes of a semiconductor processing tool, comprising the acts of:
   remotely accessing a track controller of said semiconductor processing tool;
   editing flow and recipe data without interrupting a processing track, wherein the flow and recipe data control a sequence of processing steps; opening and viewing a plurality of flows and recipes simultaneously.

16. The method of claim 15, wherein the act of remotely accessing a track controller of said semiconductor processing tool is operable with a plurality of semiconductor processing tools of at least two different types.

17. The method of claim 15, wherein remotely accessing the track controller includes communicating with the track controller through a SECS/GEM interface.

18. The method of claim 15, wherein the editing act comprises,
   renumbering flow and line numbers of the recipes in accordance with specific edits made.

19. The method of claim 15, wherein the editing act comprises,
   if a unique act is deleted or inserted renumbering the remaining acts; and
   if a duplicate act is deleted or inserted not renumbering the remaining acts.

20. The method of claim 15, wherein the editing act comprises,
   displaying multiple recipes side-by-side.

21. The method of claim 15, wherein the editing act comprises,
   comparing one or more track recipes with one or more master track recipes; and,
   indicating any differences between one or more track recipes and one or more master recipes.

22. The method of claim 15, further comprising the acts of,
   exporting recipes from the track controller to a remote database; and
   importing recipes to the track controller from a remote database.

23. A computer-readable medium carrying one or more sequences of one or more instruction for validating process data, wherein the execution of the one or more sequences of one or more instructions by one or more processors causes the one or more processors to perform the steps of:
   remotely accessing a track controller of a semiconductor processing tool; and
   remotely editing track flows and recipes utilized by said track controller to direct a sequence of processing steps, without interrupting a processing track;
   allowing a user to open and view a plurality of flows and recipes simultaneously.

24. The computer-readable medium of claim 23, wherein the computer-readable medium is operable with a plurality of semiconductor processing tools of at least two different types.

25. The computer-readable medium of claim 23, wherein remotely accessing the track controller includes,
   communicating with the track controller via a SECS/GEM interface.

26. The computer-readable medium of claim 23, wherein remotely editing track flows and recipes includes,
   renumbering flow and line numbers if a unique step is deleted or inserted; and
   renumbering line numbers only if a duplicate step is deleted or inserted.

27. The computer-readable medium of claim 23, wherein remotely editing track flows and recipes includes,
   displaying multiple flows or recipes side-by-side.

28. The computer-readable medium of claim 23, herein remotely editing track flows and recipes includes, comparing at least two flows or recipes and indicating differences between the at least two flows or recipes.

* * * * *

UNITED STATES PATENT AND TRADEMARK OFFICE
CERTIFICATE OF CORRECTION

PATENT NO.    : 6,907,308 B1
DATED         : June 14, 2005
INVENTOR(S)   : Bartlett et al.

It is certified that error appears in the above-identified patent and that said Letters Patent is hereby corrected as shown below:

<u>Title page,</u>
Item [54], Title, "SIMICONDUCTOR" should be changed to
-- SEMICONDUCTOR --.

Signed and Sealed this

Ninth Day of August, 2005

JON W. DUDAS
*Director of the United States Patent and Trademark Office*